Patented May 6, 1947

2,420,144

UNITED STATES PATENT OFFICE 2,420,144

SCALE RESISTANT CONCRETE AND CEMENT

Jacob G. Mark, Brookline, Mass., assignor to Dewey and Almy Chemical Company, North Cambridge, Mass., a corporation of Massachusetts No Drawing. Application February 18, 1942,
Serial No. 431,448

10 Claims. (Cl. 106—94)

This invention relates to hydraulic cement, concrete and mortar and more particularly to such materials having improved properties, especially with respect to enhanced resistance to deterioration by repeated freezing and thawing.

For some years one of the objectives in the cement industry has been to develop a cement which would yield a concrete having greater resistance than those heretofore available to the destructive effects of successive freezing and thawing, and especially in the presence of calcium chloride and the like. Calcium chloride is mixed with sand and scattered on highways in the winter time to melt off ice and snow. Concrete roadways cast in accordance with standard practice, which stand up under the weather of the locality, tend to scale or spall when treated with calcium chloride. Concrete can be improved somewhat in its resistance to freezing and thawing, in the presence or absence of calcium chloride, by the use of richer and drier mixes and by the use of vibration casting techniques, but, unfortunately, the increased construction cost these procedures entail precludes their use in many instances.

Objects of the invention are to provide an hydraulic cement composition which will yield a concrete of generally improved properties and particularly of enhanced resistance to repeated freezing and thawing; to provide means whereby concrete of improved resistance to freezing and thawing may be produced; and to provide cement and concrete produced therefrom exhibiting increased resistance to successive freezing and thawing in the presence of calcium chloride, common salt and similar freezing point depressants. Further objects are to provide cement and concrete of improved resistance to freezing and thawing which retain their other desirable properties unimpaired and to improve cement and concrete in these respects without materially increasing its cost. Other objects and advantages of the invention will become apparent as the description proceeds.

I have found that many of the desirable properties of concrete, and particularly its resistance to freezing and thawing, can be substantially increased, without significant impairment of other properties or increase in cost, by the addition of a relatively small proportion of the fraction of the waste liquor from the sulphate process of paper manufacture known as tall oil.

Tall oil, or talloel, is a dark-colored liquid which is separated from the black liquor produced as a residue in the manufacture of paper from wood pulp by the sulphate process. Tall oil is available commercially. Varieties are sold under the trade names "Liqro," "Indusoil" and "Wetso."

Considerable effort has been devoted to analyzing the various constituents present in tall oil to determine the exact composition and the constitution of the numerous chemical individuals present, but without great success. It is difficult to separate the various ingredients and they have as yet, for the large part, not been identified. It is known, however, that tall oil consists mainly of fatty acids, liquid resin acids and sterols. The ratios of these materials vary over a considerable range, depending on the woods from which the oil is derived, the degree of purification and other factors. Crude tall oils will generally be found to have compositions within the ranges:

|  | Per cent |
|---|---|
| Fatty acids | 40–60 |
| Liquid resin acids | 30–55 |
| Sterols | 5–10 |

Commercial distilled tall oils may contain about 85% of fatty acids and about 12% of liquid resin acids. Among the fatty acids, palmitic, oleic, linoleic and linolenic have been identified.

The resin acids are liquids of acid numbers generally in the range 60–85.

The mixture has a Universal Saybolt viscosity at 100° F. of less than 1,000 seconds and at 210° F. of less than 150 seconds. The specific gravity may vary from 0.96 to 0.98, the acid number from 140–180, and the saponification number from 129–190. The ash content is generally below 0.5% and the iodine number 145–185.

Improvement of the desirable characteristics of cement and concrete may be obtained in accordance with the invention by the addition of either crude or refined tall oil or salts or other derivatives of this material. For convenience, all of these materials will be referred to hereinafter as "tall oil."

The following table shows the increase in resistance to freezing and thawing in the presence of calcium chloride obtained by addition of various proportions of tall oil to six typical cements. The proportion of tall oil is by weight, based on the cement.

TABLE I

*Durability against freezing and thawing in the presence of CaCl₂*

[Complete cycles until failure [1]]

| Tall Oil Addition | Cement | | | | | |
|---|---|---|---|---|---|---|
| | #1 | #2 | #3 | #4 | #5 | #6 |
| 0 | 35 | 35 | 30 | 35 | 15 | 45 |
| 0.015% | 70 | 115 | 80 | 65 | 65 | 85 |
| 0.030% | | | | | 60 | 65 |
| 0.050% | | | | | 55 | 65 |

[1] Sample was considered to have failed when it had lost 20% of its original weight.

The increase in resistance to freezing and thawing is further illustrated by the following table which shows the rate of disintegration of cement #2, Table I, with and without tall oil:

TABLE II

*Rate of disintegration during freezing and thawing cycles*

[Weight loss in per cent]

| Cycles | Blank | Tall Oil 0.015% |
|---|---|---|
| 10 | 1.0 | 0 |
| 20 | 5.0 | 0 |
| 30 | 14.0 | 0 |
| 40 | 42.0 | 0 |
| 50 | | 0 |
| 60 | | 0 |
| 70 | | 0.5 |
| 80 | | 1.5 |
| 90 | | 5.0 |
| 100 | | 7.5 |
| 110 | | 15.0 |
| 120 | | 39.0 |

In preparing cements and mortars in accordance with the invention, the tall oil may be added to the wet mix prepared in the conventional manner, or may be first incorporated with any of the ingredients before mixing, but, for reasons which will hereinafter appear more fully, it is preferred to make the additions to the Portland cement clinker before or during grinding.

Tall oil also has been found to exert a plasticizing effect on concrete mixes when included in the proportions utilized in the present invention. This plasticizing effect results in markedly improved workability of the mix so that the minimum degree of fluidity required for satisfactory workability can be obtained with a smaller proportion of water with the consequent improvement in the properties of the finished concrete which is well known as following reduction in the mixing water. The improvement of two typical cements in this respect is shown in the following table of water/cement ratios required to give a slump of 3.5 inches as measured by the standard 12 inch cone test with the standard 1–6 mix.

TABLE III

[W/C ratios]

| Tall Oil Addition | Cement | |
|---|---|---|
| | A | B |
| 0 | 0.90 | 0.90 |
| 0.015 | 0.85 | 0.83 |
| 0.030 | 0.85 | 0.83 |
| 0.050 | 0.83 | 0.83 |

It has also been found that tall oil acts as a grinding aid, materially reducing the time and power consumption required to reduce the clinker to a given limit of fineness.

It will be appreciated that the proportion of addition agent which is desirable for different purposes and different conditions will vary over a considerable range and will vary with the composition and degree of refinement of the tall oil. In every case the proportion of tall oil used is relatively small. It has been found that the effects of the invention may be obtained to best advantage by the addition of tall oil in proportions within the range of 0.007% to 0.050% by weight of tall oil on the cement component of the mix. Additions in quantities below this range are beneficial but the effect is generally small and not of much practical significance; quantities above this range may produce undesirable effects, such as too great a decrease in the density of the finished concrete.

The maximum increase of resistance to freezing and thawing with minimum reduction in density is obtained with cements in common use by addition of tall oil in the range of 0.010% to 0.030%, on the cement. The preferred amount within this range is 0.015%.

It will be understood that the particular compositions and proportions given above are given for the purpose of illustration and not of limitation and that variations therein can be made without departing from the invention as defined in the following claims.

I claim:

1. A concrete or mortar mix adapted to yield concrete or mortar of enhanced resistance to freezing and thawing comprising an hydraulic cement, aggregate and not more than 0.050% of tall oil, by weight on the cement.

2. Hydraulic cement and aggregate with which is combined a small proportion of tall oil and which is thereby adapted to yield concrete or mortar of an enhanced resistance to freezing and thawing.

3. The method of making a concrete or mortar of enhanced resistance to freezing and thawing which comprises incorporating a relatively small proportion of tall oil in the cement-aggregate mix.

4. A cement composition adapted to yield concrete or mortar of enhanced resistance to freezing and thawing comprising an hydraulic cement, aggregate and tall oil in the amount of 0.007% to 0.05% of the weight of the cement.

5. A concrete or mortar mix adapted to yield concrete of enhanced resistance to freezing and thawing comprising an hydraulic cement, aggregate and tall oil in the amount of 0.007% to 0.05% of the weight of the cement.

6. The method of making a concrete or mortar of enhanced resistance to freezing and thawing which comprises incorporating tall oil in a cement-aggregate mix in the amount of 0.007% to 0.05% of the weight of the cement.

7. A concrete or mortar mix adapted to yield concrete or mortar of enhanced resistance to freezing and thawing in the presence of calcium chloride comprising an hydraulic cement, aggregate and a relatively small proportion of tall oil.

8. The method of making a concrete or mortar of enhanced resistance to freezing and thawing in the presence of calcium chloride which comprises incorporating a relatively small proportion of tall oil in a cement-aggregate mix.

9. Hydraulic cement with which is combined aggregate and not more than .050% of its weight of tall oil and which is thereby adapted to yield concrete or mortar of an enhanced resistance to freezing and thawing.

10. The method of making an hydraulic cement which comprises grinding Portland cement clinker with tall oil.

JACOB G. MARK.

REFERENCES CITED

The following references are of record in the file of this patent:

UNITED STATES PATENTS

| Number | Name | Date |
|---|---|---|
| 1,657,716 | Hinton | Jan. 31, 1928 |
| 1,076,028 | Ellis | Oct. 21, 1913 |
| 2,311,289 | Booth | Feb. 16, 1943 |

OTHER REFERENCES

Article by O. L. Moore, Engineering News Record, vol. 125, No. 15, pages 471–474 (Oct. 10, 1940) (reprint 106–94).